United States Patent
Maehara

(10) Patent No.: US 9,493,039 B2
(45) Date of Patent: Nov. 15, 2016

(54) PNEUMATIC TIRE

(71) Applicant: Sumitomo Rubber Industries, Ltd., Kobe-shi, Hyogo (JP)

(72) Inventor: Atsushi Maehara, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 350 days.

(21) Appl. No.: 14/053,709

(22) Filed: Oct. 15, 2013

(65) Prior Publication Data

US 2014/0130949 A1 May 15, 2014

(30) Foreign Application Priority Data

Nov. 9, 2012 (JP) .................................. 2012-247714

(51) Int. Cl.
*B60C 11/11* (2006.01)
*B60C 11/03* (2006.01)

(52) U.S. Cl.
CPC .......... *B60C 11/0302* (2013.04); *B60C 11/033* (2013.04); *B60C 11/0306* (2013.04); *B60C 2011/0346* (2013.04); *B60C 2011/0365* (2013.04); *B60C 2011/0372* (2013.04); *B60C 2011/0381* (2013.04); *B60C 2200/06* (2013.04)

(58) Field of Classification Search
CPC ............. B60C 11/033; B60C 11/0302; B60C 11/0306; B60C 11/11; B60C 2011/0381
See application file for complete search history.

(56) References Cited

U.S. PATENT DOCUMENTS

| 6,220,321 B1 | 4/2001 | Yoshioka et al. |
| 6,561,242 B2 * | 5/2003 | Chaen ..................... B60C 11/11 152/209.18 |
| 2006/0102267 A1 * | 5/2006 | Takahashi ........... B60C 11/0306 152/209.18 |

FOREIGN PATENT DOCUMENTS

JP 2006-111091 * 4/2006

OTHER PUBLICATIONS

English machine translation of JP2006-111091, dated Apr. 2006.*

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A pneumatic tire has a unidirectional tread pattern. The land ratio of an imaginary crown region 5A is 0.75 to 0.85. The land ratio of an imaginary middle region 6A is 0.65 to 0.75. Crown axial grooves 4A and middle axial grooves 4B are inclined to the intended tire rotational direction toward the axially inside of the tire. The widths of the crown axial grooves 4A and the middle axial grooves 4B are 4.0 to 7.0 mm. The width of the crown axial grooves 4A is more than the width of a central main groove 3A and less than the width of middle main grooves 3B.

18 Claims, 2 Drawing Sheets

PNEUMATIC TIRE

BACKGROUND OF THE INVENTION

The present invention relates to a pneumatic tire, more particularly to a unidirectional tread pattern suitable for heavy duty tires and capable of improving the drainage and the wear resistance in a well balanced manner.

In the heavy duty tires such as truck/bus tires, rib-type tread patterns are widely employed. But, in order to obtain good wet performances, block-type tread patters are also widely employed in recent years.

The drainage performance of a block-type tread pattern can be improved by increasing the widths of grooves dividing the blocks.

In the case of the heavy duty tires, as the load or ground pressure of each block is very high in comparison with the passenger car tires, the wear of the block is very liable to increase even if the rigidity decrease of the block due to the increased groove width is small.

SUMMARY OF THE INVENTION

It is therefore, an object of the present invention to provide a pneumatic tire, in which the drainage and the wear resistance are improved in a well balanced manner.

According to the present invention, a pneumatic tire comprises:

a tread portion provided with a unidirectional tread pattern having an intended tire rotational direction and defined by circumferentially continuously extending five main grooves dividing the tread portion into six rows of circumferentially arranged blocks which are a pair of axially inner rows of crown blocks divided by crown axial grooves, a pair of axially outer rows of shoulder blocks divided by shoulder axial grooves and a pair of in-between rows of middle blocks divided by middle axial grooves, wherein an imaginary crown region, which is defined between two lines extending parallel with the tire circumferential direction passing through both axially outermost ends of the crown blocks in each of the axially inner rows, has a land ratio of from 0.75 to 0.85, an imaginary middle region, which is defined between two lines extending parallel with the tire circumferential direction passing through both axial ends of the middle blocks in each of the in-between rows, has a land ratio of from 0.65 to 0.75, the crown axial grooves and the middle axial grooves are each inclined to the intended tire rotational direction toward the axially inside of the tire, the crown axial grooves and the middle axial grooves each have a widths of from 4.0 to 7.0 mm, and the widths of the crown axial grooves are more than the width of the central main groove and less than the widths of the middle main grooves next to the central main groove.

Here, the land ratio is the ratio of the ground contacting area to the gross area of a region concerned.

The pneumatic tire according to the present invention may be provided with the following features ( )-( ):

(1) each of the middle main grooves is a zigzag groove having two oblique parts per each zigzag pitch thereof, and the two oblique parts are inclined to the axially outside of the tire toward the intended tire rotational direction;

(2) the crown axial grooves in both of the rows are arranged at identical circumferential pitches, and the crown axial grooves on one side of the tire equator are circumferentially shifted by a half pitch from the crown axial grooves on the other side of the tire equator; and (3) each of the crown blocks is provided in its midpoint in the tire circumferential direction with a notch extending axially outwardly from the central main groove and terminating within the crown block so as to have an axial length of from 1.0 to 5.0 mm.

Therefore, the crown blocks subjected to larger load during straight running, and the middle blocks subjected to smaller load than the crown blocks are provided with high rigidities suitable therefor in a well balanced manner. As a result, the middle blocks and crown blocks are evened in the ground pressure, and the wear resistance is improved.

As the crown axial grooves and the middle axial grooves are inclined, the drainage from the tire equator side toward the tread edge side is facilitated owing to the rotation of the tire.

By limiting the widths of the crown axial grooves and middle axial grooves as above, the rigidities of the crown blocks and shoulder blocks are optimized, and the wear resistance can be further improved.

By setting the crown axial grooves wider than the central main groove and narrower than the middle main grooves as above, the rigidities of the crown blocks and shoulder blocks are further optimized, Since the ground pressure of the crown blocks becomes relatively high in the vicinity of the tire equator, the central main grooves are subjected to a large compressive force, and thereby the water in the crown grooves is effectively discharged. Further, the drainage from the central main groove to the middle main grooves through the crown axial grooves is increased.

The pneumatic tire according to the present invention is therefore, improved in the drainage and the wear resistance in a well balanced manner.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch of the tire (camber angle=0) in the normally inflated loaded condition.

The tread width TW is the axial distance between the tread edges Te measured in the normally inflated unloaded condition of the tire.

DESCRIPTION OF THE PREFERRED EMBODIMENTS

Figure 1:
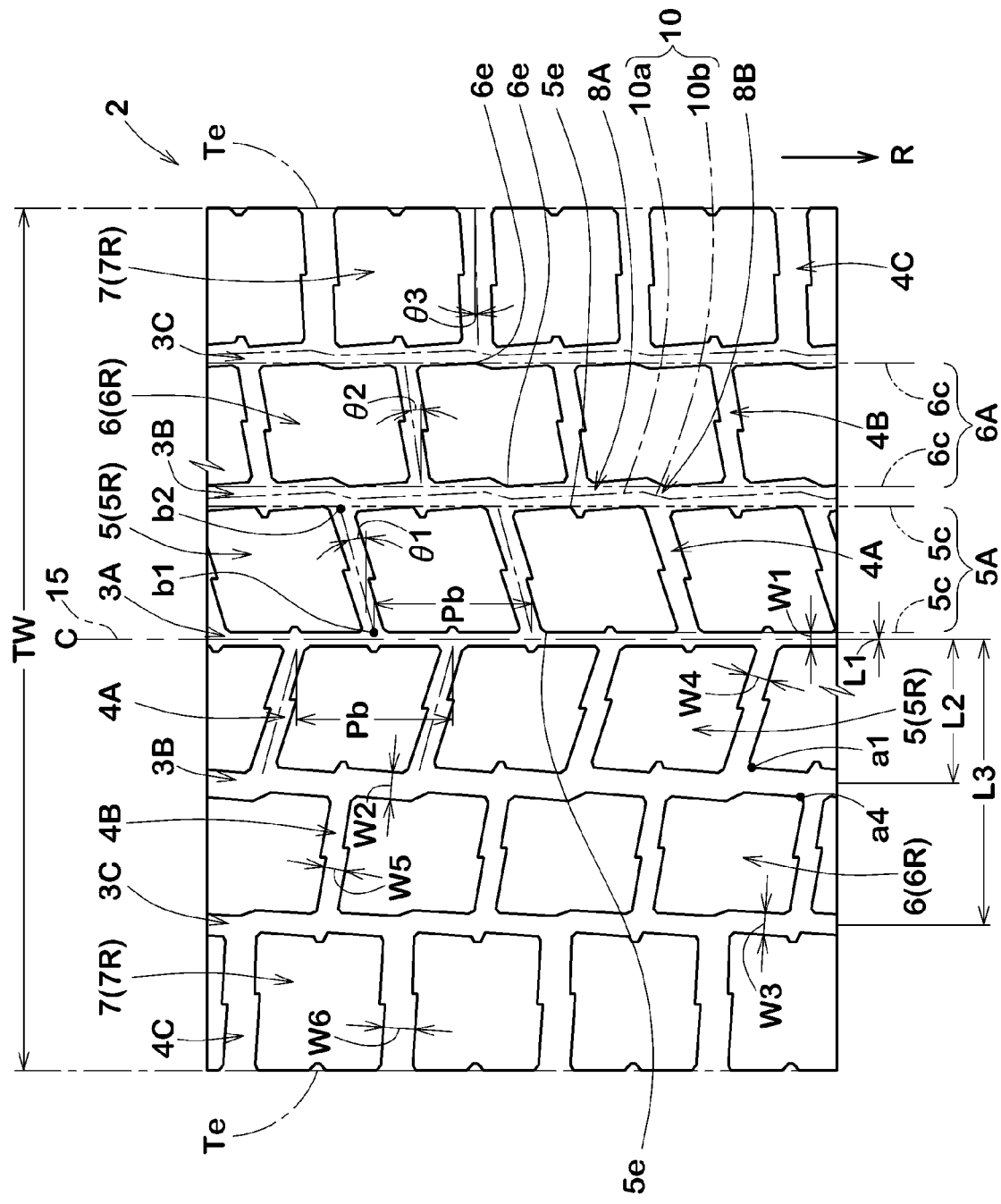
FIG. 1 is a developed partial view of the tread portion of a pneumatic tire as an embodiment of the present invention.

Embodiments of the present invention will now be described in detail in conjunction with the accompanying drawings.

In the drawings, a pneumatic tire according to the present invention is a heavy duty tire for truck and bus, and the tread portion 2 in this embodiment is provided with a nonsymmetric tread pattern having an intended tire rotational direction R which may be indicated in the tire sidewall portions (not shown) by using symbols, characters or the like.

The tread portion 2 is provided with circumferentially continuously extending main grooves and axial grooves intersecting the main grooves.

The main grooves are:
a central main groove 3A which is disposed on the tire equator C, and
a middle main groove 3B and an axially outer shoulder main groove 3C which are disposed on each side of the central main groove 3A.

The axial grooves are:
crown axial grooves 4A extending between the central main groove 3A and the middle main grooves 3B,
middle axial grooves 4B extending between the middle main grooves 3B and the shoulder main grooves 3C, and
shoulder axial grooves 4C extending between the shoulder main grooves 3C and the tread edges Te.

Thereby, the tread portion 2 is divided into six circumferential rows of blocks which are:
a pair of crown block rows 5R of crown blocks 5 separated by the central main groove 3A, the middle main grooves 3B and the crown axial grooves 4A and arranged circumferentially of the tire at intervals,
a pair of middle block rows 6R of middle blocks 6 separated by the middle main grooves 3B, the shoulder main grooves 3C and the middle axial grooves 4B and arranged circumferentially of the tire at intervals, and
a pair of shoulder block row 7R of shoulder blocks 7 separated by the shoulder main grooves 3C, the tread edges Te and the shoulder axial grooves 4C and arranged circumferentially of the tire at intervals.

The central main groove 3A is formed as a straight groove whose edges are parallel with the circumferential direction in order to facilitate the drainage and also not to decrease the circumferential rigidity of the axially inner part of the crown block 5 subjected to a large load during straight running and thereby improve the wear resistance.

Each of the middle main grooves 3B is a zigzag groove consisting of alternate long segments 8A and short segments 8B. Toward the intended tire rotational direction, the center line 10a of the long segment 8A is slightly inclined to the axially outside, and the center line 10b of the short segment 8B is inclined to the axially inside.

Each of the shoulder main grooves 3C is a zigzag groove consisting of alternate long segments 13A and short segments 13B. Toward the intended tire rotational direction, the center line of the long segment 13A is slightly inclined to the axially outside, and the center line of the short segment 13B is inclined to the axially inside.

Figure 2:
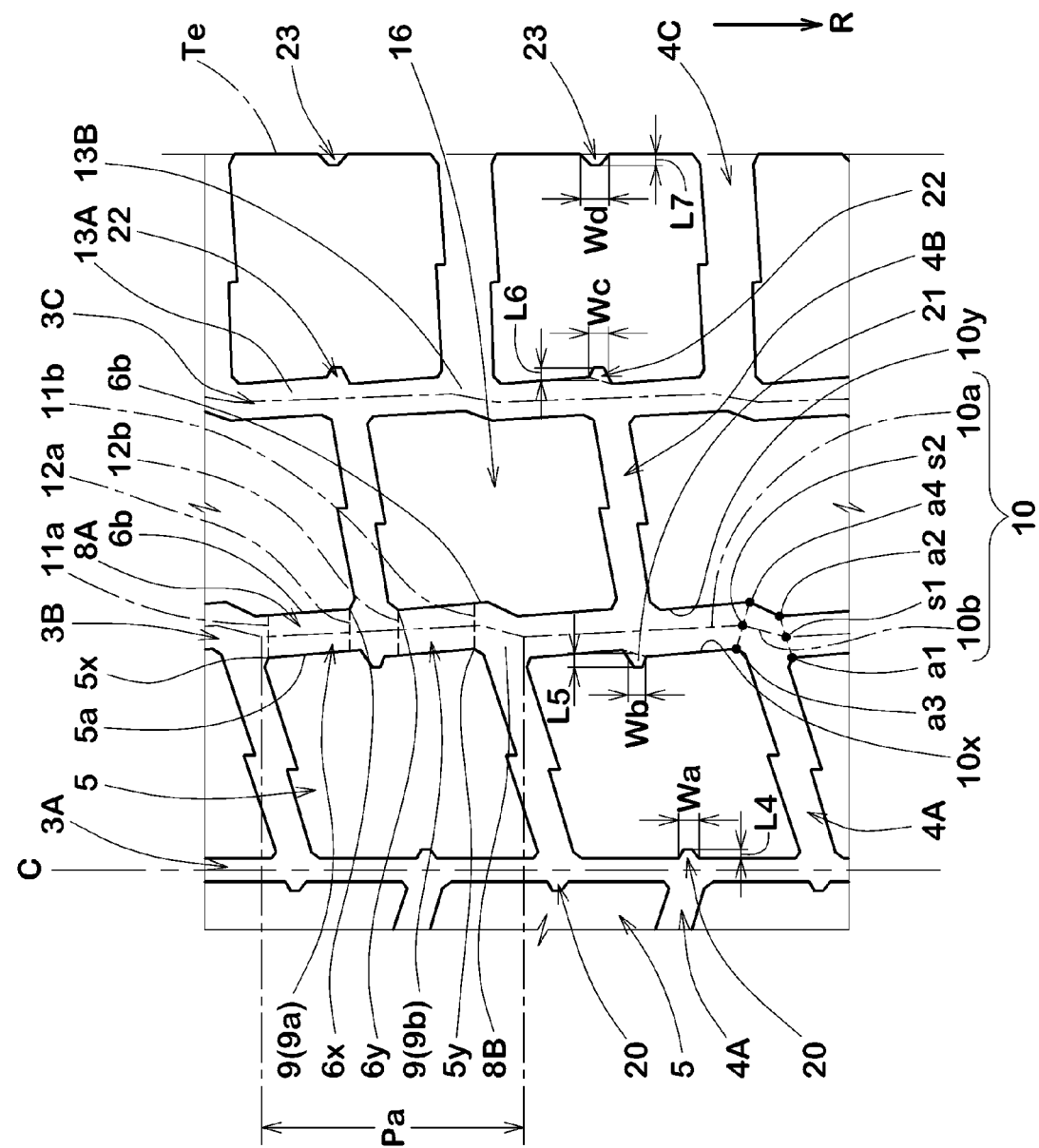
FIG. 2 is a closeup of a part of FIG. 1.

As shown in FIG. 2, the center line 10 (10a and 10b) of the middle main groove 3B is made up of straight segments each extending between
a midpoint s1 between one of the axially innermost points a1 of the axially inside groove edge 10x of the middle main groove 3B and one of the axially innermost points a2 of the axially outside groove edge 10y of the middle main groove 3B and
a midpoint s2 between one of the axially outermost points a3 of the axially inside groove edge 10x and one of the axially outermost points a4 of the outside groove edge 10y. (the same is applied to the shoulder main groove 3C)

The long segments 8A in this embodiment comprises oblique parts 9 inclined to the axially outside toward the intended tire rotational direction.

In this embodiment, the oblique parts 9 are defined between a pair of straight lines 11a and 11b drawn to extend toward the axially outside in parallel with the axially direction from one end 5x and the other end 5y of the circumferentially extending axially outer edge 5a of each of the crown blocks 5, and a pair of straight lines 12a and 12b drawn to extend toward the axially inside in parallel with the axially direction from one end 6x and the other end 6y of the circumferentially extending axially inner edge 6b of each of the middle blocks 6. Thus, each of the long segments 8A comprises a first oblique part 9a between the lines 11a and 12a and a second oblique part 9b between the lines 11b and 12b, namely, two oblique parts 9 are provided per one zigzag pitch Pa of the middle main groove 3B.

Such oblique parts 9 reduce the drainage flow resistance of the long segment 8A and improve the drainage.

Since the oblique parts 9 in this embodiment are straight, the rigidities of the crown block 5 and middle block 6 are not decreased. This improves the wear resistance.

The width w1 of the central main groove 3A is less than the width w2 of the middle main grooves 3B.

This secures a high rigidity of the crown block 5 subjected to a large load, and improves the wear resistance.

In order to effectively derive this advantageous effect, the width w1 of the central main groove 3A is preferably set in a range of not less than 0.8%, more preferably not less than 1.2%, but not more than 2.4%, more preferably not more than 2.0% of the tread width TW, and
the width w2 of the middle main groove 3B is preferably set in a range of less than 1.5%, more preferably not less than 1.0%, but not more than 4.5%, more preferably not more than 4.0% of the tread width TW.

In order to improve the drainage and the wear resistance in a well balanced manner, the width w3 of the shoulder main grooves 3C is preferably set in a range of not less than 1.0%, more preferably not less than 1.5%, but not more than 4.0%, more preferably not more than 3.5% of the tread width TW.

The depth of each of the main grooves 3A-3C is preferably set in a range of from 10 to 25 mm.

In order to secure the axial rigidity of each block 5-7 and a good drainage of each main groove 3A-3C in a well balanced manner, it is preferred that the axial distance L1 of the widthwise center line of the central main groove 3A from the tire equator C is set in a range of from 0% to 2% of the tread width TW,
the axial distance L2 of the widthwise center line of the middle main groove 3B from the tire equator C is set in a range of from 12% to 22% of the tread width TW, and
the axial distance L3 of the widthwise center line of the shoulder main groove 3C from the tire equator C is set in a range of from 28% to 33% of the tread width TW.

The above-mentioned crown axial grooves 4A are each inclined to the intended tire rotational direction toward the axially inside in order to facilitate the drainage from the tire equator side toward the tread edge side by utilizing the rotation of the tire.

If the angle $\theta 1$ of the crown axial grooves 4A with respect to the tire axial direction is large, the axial rigidity of the crown block 5 decreases and there is a possibility that the wear resistance is deteriorated.

Therefore, the angle $\theta 1$ of the crown axial groove 4A is preferably set in a range of not less than 10 degrees, more preferably not less than 12 degrees, but not more than 20 degrees, more preferably not more than 18 degrees with respect to the tire axial direction.

In this application, the angle of the axial groove is of the straight line drawn between both axial ends of the widthwise center line of the axial groove.

The crown axial groove 4A in this embodiment is zigzag or cranked in order to increase the groove volume and improve wet performance.

The crown axial grooves 4A are arranged circumferentially of the tire at identical pitches Pb, and the crown axial grooves 4A on one side of the tire equator C are circumferentially shifted by a half pitch Pb/2 from the crown axial grooves 4A on the other side of the tire equator C. Therefore, the circumferential rigidity of the crown blocks 5 in their parts near the tire equator C subjected to a large load during straight running, becomes uniformed and the wear resistance is improved.

The middle axial grooves 4B are each inclined to the intended tire rotational direction toward the axially inside in order to facilitate the drainage from the tire equator side toward the tread edge side by utilizing the rotation of the tire. For similar reason, the shoulder axial grooves 4C are each inclined to the intended tire rotational direction toward the axially inside.

The angle $\theta 2$ of the middle axial groove 4B is set to be less than the angle $\theta 1$ of the crown axial groove 4A and more than the angle $\theta 3$ of the shoulder axial groove 4C.

Therefore, the axial rigidities of the blocks 5-7 are increased toward the tread edge side subjected to a large side force during cornering, and their wear resistance can be improved in a well balanced manner. Further, during cornering, the draining from the shoulder axial grooves 4C to the tread edge Te may be facilitated by the centrifugal force.

In order to effectively derive such advantageous effects, the angle $\theta 2$ of the middle axial grooves 4B is preferably set in a range of not less than 3 degrees, more preferably not less than 4 degrees, but not more than 10 degrees, more preferably not more than 9 degrees.

The angle $\theta 3$ of the shoulder axial grooves 4C is preferably set in a range of not less than 0.5 degrees, more preferably not less than 1 degrees, but not more than 5 degrees, more preferably not more than 4.5 degrees.

The width w4 of the crown axial grooves 4A and the width w5 of the middle axial grooves 4B are set in a range of not less than 4.0 mm, preferably not less than 4.5 mm, but not more than 7.0 mm, preferably not more than 6.5 mm.

Such crown axial grooves 4A and middle axial grooves 4B can drain water therein from the tire equator side toward the tread edge side by utilizing the rotation of the tire.

By limiting the widths w4 and w5 of the crown axial grooves 4A and middle axial grooves 4B as explained above, the rigidities of the crown blocks 5 and middle blocks 6 are secured surely and the wear resistance may be further improved.

The width w4 of the crown axial grooves 4A is set to be more than the width w1 of the central main grooves 3A, and less than the width w2 of the middle main grooves 3B.

By limiting the widths w1, w2 and w4 of the main grooves 3A and 3B and the axial grooves 4A as explained above, the crown blocks 5 subjected to a large load during straight running can be provided with high rigidity. Thereby, the rigidities of the crown blocks 5 and middle blocks 6 are secured in a well balanced manner.

The ground pressure of the crown blocks 5 becomes relatively high near the tire equator C. Thereby, the water in the central main groove 3A is subjected to a large compressive force and effectively discharged. Further, by limiting the groove width as explained above, the drainage from the central main groove 3A to the middle main grooves 3B through the crown axial grooves 4A is facilitated.

In the pneumatic tire according to the present invention, accordingly, the drainage and the wear resistance can be improved in a well balanced manner In order to effectively derive such advantageous effects, the width w2 of the middle main groove 3B is preferably not less than 1.1 times the width w4 of the crown axial groove 4A. If the width w2 of the middle main groove 3B is excessively larger than the width w4 of the crown axial groove 4A, there is a possibility that the rigidity of the crown blocks 5 or middle blocks 6 becomes insufficient.

Therefore, the width w2 of the middle main groove 3B is preferably set in a range of not more than 2.0 times, more preferably not more than 1.5 times the width w4 of the crown axial groove 4A.

Preferably, the width w6 of the shoulder axial grooves 4C is more than the width w4 of the crown axial grooves 4A and more than the width w5 of the middle axial grooves 4B. Thereby, the drainage from the tire equator side toward the tread edge side is furthered.

The width w6 of the shoulder axial groove 4C is preferably set in a range of not less than 5.5 mm, more preferably not less than 6.0 mm, but not more than 10.0 mm, more preferably not more than 9.5 mm.

In order to effectively derive the above explained advantageous effects, the depth of each of the axial grooves 4A-4C is set in a range of from 10 to 25 mm.

According to the present invention, the land ratio Lc of an imaginary crown region 5A is set in a range of not less than 0.75, preferably not less than 0.77, but not more than 0.85, preferably not more than 0.83, and
the land ratio Lm of an imaginary middle region 6A is set in a range of not less than 0.65, preferably not less than 0.67, but not more than 0.75, preferably not more than 0.73.

Here, the imaginary crown region 5A is defined with respect to each of the crown block rows 5R, as the annular region between
a circumferentially extending straight line 5c passing through the axial innermost ends 5e of the crown blocks 5 and
a circumferentially extending straight line 5c passing through the axial outermost ends 5e of the crown blocks 5, The imaginary middle region 6A is defined with respect to each of the middle block rows 6R, as the annular region between
a circumferentially extending straight line 6c passing through the axial innermost ends 6e of the middle blocks 6 and
a circumferentially extending straight line 6c passing through the axial outermost ends 6e of the middle blocks 6, Thereby, the crown blocks 5 and the middle blocks 6 are provided with high rigidities, and the rigidity of the crown blocks 5 subjected to a large load during straight running and the rigidity of the middle blocks 6 subjected to a load not so large as the crown block 5 are secured in a well balanced manner. Accordingly, the ground pressure of the middle blocks 6 and the ground pressure of the crown blocks 5 are reduced and uniformed, therefore, the wear resistance is improved.

If the land ratio Lc of the imaginary crown region 5A and the land ratio Lm of the imaginary middle region 6A are excessively large, the drainage become worse.

In order to effectively derive the above advantageous effects, the land ratio Lc of the imaginary crown region 5A is preferably more than the land ratio Lm of the imaginary middle region 6A If the land ratio Lc of the imaginary crown region 5A is excessively larger than the land ratio Lm of the imaginary middle region 6A, the rigidity of the middle blocks 6 decreases largely.

Therefore, the ratio Lc/Lm of the land ratio Lc of the imaginary crown region 5A to the land ratio Lm of the imaginary middle region 6A is preferably set in a range of not less than 1.05, more preferably not less than 1.10, but not more than 1.25, more preferably not more than 1.20.

The crown blocks 5 are each provided with an inside notch 20 at the midpoint of the crown block 5 in the tire circumferential direction so as to extend axial outwardly from the central main groove 3A and terminate within the crown block 5.

As a result, the axial rigidity of the crown block 5 becomes evened in the tire circumferential direction, and the wear resistance is improved circumferentially of the tire in a well balanced manner.

If the axial length L4 of the inside notch 20 is large, the axial rigidity is excessively decreased at the midpoint of the crown block 5 in the tire circumferential direction, and there is a possibility that the wear resistance can not be exerted in a well balanced manner.

Therefore, the axial length L3 of the inside notch 20 is preferably set in a range of not less than 1.0 mm, more preferably not less than 2.0 mm, but not more than 5.0 mm, more preferably not more than 4.0 mm.

Here, the length L4 is the axial distance between the midpoint of the open end of the inside notch 20 and the closed end of the inside notch 20. (the same is applied to the lengths of the undermentioned other notches)

In order to effectively exert the above-mentioned effect, the groove width wa of the inside notch 20 is preferably set in a range of not less than 0.5 mm, more preferably not less than 1.0 mm, but not more than 2.5 mm, more preferably not more than 2.0 mm.

The groove depth of the inside notch 20 is preferably set in a range of not less than 20%, more preferably not less than 25%, but not more than 40%, more preferably not more than 35% of the depth of the central main groove 3A.

Here, the groove width wa of the notch 20 is the width measured perpendicular to the tire axial direction and averaged along the length defined as above. (the same is applied to the groove width of the undermentioned other notches)

In this embodiment, the open end of the inside notch 20 is overlapped in the tire circumferential direction with the open end on the tire equator C side of the crown axial groove 4A. Therefore, the water in the inside notch 20 is effectively discharged through the crown axial groove 4A, and the drainage is improved.

In this embodiment, each of the crown blocks 5 is further provided with an outside notch 21 at the midpoint of the crown block 5 in the tire circumferential direction so as to extend axially inwardly from the middle main groove 3B and terminate within the crown block 5.

The axial length L5 of the outside notch 21 is preferably set in a range of not less than 1.0 mm, more preferably not less than 2.0 mm, but not more than 5.0 mm, more preferably not more than 4.0 mm. Therefore, the axial rigidity of the crown block 5 is more effectively evened in the circumferential direction.

In order to effectively exert the above-mentioned effect, the groove width wb of the outside notch 21 is preferably set in a range of not less than 0.5 mm, more preferably not less than 1.0 mm, but not more than 2.5 mm, more preferably not more than 2.0 mm.

The groove depth of the outside notch 21 is preferably set in a range of not less than 20%, more preferably not less than 25%, but not more than 40%, more preferably not more than 35% of the depth of the middle main groove 3B.

The open end of the outside notch 21 is overlapped in the tire circumferential direction with the axially inner open end of one of the middle axial grooves 4B.

Thereby, the water in the outside notch 21 is effectively discharged through the middle axial groove 4B.

In this embodiment, the ground contacting top surface of each of the middle blocks 6 is provided with no void such as groove, notch and sip.

In this embodiment, each of the shoulder blocks 7 is provided with an axially inside notch 22 at the midpoint of the shoulder block 7 in the tire circumferential direction so as to extend axially outwardly from the shoulder main groove 3C and terminate within the shoulder block 7, and an axially outside notch 23 at the midpoint of the shoulder block 7 in the tire circumferential direction so as to extend axially inwardly from the tread edge Te and terminate within the shoulder block 7.

Such inside notch 22 and outside notch 23 can even the axial rigidity of the shoulder block 7 in the circumferential direction. Accordingly, the wear resistance of the shoulder block 7 is improved. Further, the shoulder inside notch 22 and outside notch 23 may improve the drainage.

In order to effectively derive the above explained effects in a well balanced manner,
the axial lengths L6 and L7 of the inside notch 22 and outside notch 23 are preferably set in a range of not less than 1.0 mm, more preferably not less than 2.0 mm, but not more than 5.0 mm, more preferably not more than 4.0 mm,
the groove widths wc and wd of the inside notch 22 and outside notch 23 are preferably set in a range of not less than 2.0 mm, more preferably not less than 3.0 mm, but not more than 6.0 mm, more preferably not more than 5.0 mm, and
the depths of the inside notch 22 and outside notch 23 are preferably set in a range of not less than 20%, more preferably not less than 25%, but not more than 40%, more preferably not more than 35% of the depth of the shoulder main groove 3C.

Comparison Tests

Based on the tread pattern shown in FIG. 1, heavy duty tires of size 315/80R22.5 (rim size 9.75×22.5) were manufactured and tested for the wear resistance and drainage.

The specifications thereof are shown in Table 1.

Common specifications are as follows:
tread width TW: 270 mm
depth of central main groove: 20.2 mm
depth of middle main grooves: 20.2 mm
depth of shoulder main grooves: 20.2 mm
depth of crown axial grooves: 20.2 mm
depth of middle axial grooves: 20.2 mm
depth of shoulder axial grooves: 14.1 mm
groove depth of crown block's inside notch: 30% depth of central main groove
groove depth of crown block's outside notch: 30% depth of middle main grooves
groove depth of shoulder block's inside notch: 30% depth of shoulder main grooves
groove depth of shoulder block's outside notch: 30% depth of shoulder main grooves <Drainage (Wet Braking Performance) Test>

The test tires were installed on all wheels of a test vehicle (Japan-made 2-D wheel type 8 ton truck equipped with an anti-lock brake system). when the test vehicle ran on a wet asphalt road of a tire test course covered with 0.5 to 2.0 mm depth of water at a speed of 65 km/h, a full brake was applied, and the braking distance necessary to reduce the speed from 60 km/h to 20 km/h was measured. The results are indicated in Table 1 by an index based on the embodiment tire Ex.1 being 100, wherein the larger the value, the better the wet braking performance (drainage).

tire pressure: 850 kPa
load of truck: 100% (8 tons)<

<Wear Resistance Test>

The above-mentioned test vehicle was run for 8000 km on public roads (expressway 50%, highway 35%, mountain road 15%). Then, the decrease in depth of the central main groove and middle main grooves was measured at eight circumferential positions. Each measure position was 10 mm from the heel-side end of each axial edge of the crown block toward the toe-side end thereof. The results are indicated in Table 1 by an index based on the embodiment tire Ex.1 being 100, wherein the larger value is better.

From the test results, it was confirmed that the drainage and the wear resistance of the embodiment tires were improved in a well balanced manner in comparison with the comparative example tires.

TABLE 1

|  | Tire | | | | | | |
| --- | --- | --- | --- | --- | --- | --- | --- |
|  | Ex. 1 | Ref. 1 | Ex. 2 | Ex. 3 | Ref. 2 | Ref. 3 | Ex. 4 |
| land ratio Lc | 0.80 | 0.72 | 0.75 | 0.85 | 0.90 | 0.80 | 0.80 |
| land ratio Lm | 0.70 | 0.70 | 0.70 | 0.70 | 0.70 | 0.60 | 0.65 |
| Lc/Lm (%) | 1.14 | 1.03 | 1.07 | 1.21 | 1.29 | 1.33 | 1.23 |
| crown axial groove width W4 (mm) | 5.5 | 5.5 | 5.5 | 5.5 | 5.5 | 5.5 | 5.5 |
| middle main groove width W2/width W4 | 1.1 | 1.1 | 1.1 | 1.1 | 1.1 | 1.1 | 1.1 |
| central main groove width W1/tread TW (%) | 1.6 | 1.6 | 1.6 | 1.6 | 1.6 | 1.6 | 1.6 |
| drainage | 100 | 115 | 108 | 90 | 75 | 80 | 95 |
| wear resistance | 100 | 75 | 90 | 109 | 115 | 110 | 102 |

|  | Tire | | | | | | |
| --- | --- | --- | --- | --- | --- | --- | --- |
|  | Ex. 5 | Ref. 4 | Ref. 5 | Ex. 6 | Ex. 7 | Ref. 6 | Ref. 7 |
| land ratio Lc | 0.80 | 0.80 | 0.80 | 0.80 | 0.80 | 0.80 | 0.80 |
| land ratio Lm | 0.75 | 0.77 | 0.70 | 0.70 | 0.70 | 0.70 | 0.70 |
| Lc/Lm (%) | 1.07 | 1.04 | 1.14 | 1.14 | 1.14 | 1.14 | 1.14 |
| crown axial groove width W4 (mm) | 5.5 | 5.5 | 3.5 | 4.5 | 7.0 | 7.5 | 5.5 |
| middle main groove width W2/width W4 | 1.1 | 1.1 | 1.1 | 1.1 | 1.1 | 1.1 | 1.0 |
| central main groove width W1/tread TW (%) | 1.6 | 1.6 | 1.6 | 1.6 | 1.6 | 1.6 | 1.6 |
| drainage | 103 | 110 | 80 | 88 | 102 | 110 | 80 |
| wear resistance | 95 | 80 | 110 | 105 | 95 | 80 | 110 |

|  | Tire | | | | | |
| --- | --- | --- | --- | --- | --- | --- |
|  | Ex. 8 | Ex. 9 | Ex. 10 | Ex. 11 | Ex. 12 | Ex. 13 |
| land ratio Lc | 0.80 | 0.80 | 0.80 | 0.80 | 0.77 | 0.75 |
| land ratio Lm | 0.70 | 0.70 | 0.70 | 0.70 | 0.70 | 0.70 |
| Lc/Lm (%) | 1.14 | 1.14 | 1.14 | 1.14 | 1.10 | 1.07 |
| crown axial groove width W4 (mm) | 5.5 | 5.5 | 5.5 | 5.5 | 6.5 | 7.5 |
| middle main groove width W2/width W4 | 2.0 | 2.2 | 1.1 | 1.1 | 1.1 | 1.1 |
| central main groove width W1/tread TW (%) | 1.6 | 1.6 | 0.6 | 0.8 | 2.4 | 2.6 |
| drainage | 110 | 110 | 90 | 95 | 105 | 105 |
| wear resistance | 87 | 84 | 104 | 103 | 95 | 90 |

The invention claimed is:

1. A pneumatic tire comprising:
a tread portion provided with a unidirectional tread pattern having an intended tire rotational direction and defined by circumferentially continuously extending five main grooves dividing the tread portion into six rows of circumferentially arranged blocks which are a pair of axially inner rows of crown blocks circumferentially divided by crown axial grooves, a pair of axially outer rows of shoulder blocks circumferentially divided by shoulder axial grooves and a pair of in-between rows of middle blocks circumferentially divided by middle axial grooves, wherein
an imaginary crown region, which is defined between two lines extending parallel with the tire circumferential direction passing through both axially outermost ends of the crown blocks in each of the axially inner rows, has a land ratio of from 0.75 to 0.85,
an imaginary middle region, which is defined between two lines extending parallel with the tire circumferential direction passing through both axial ends of the middle blocks in each of the in-between rows, has a land ratio of from 0.65 to 0.75,
the land ratio of the imaginary crown region is in a range of from 1.05 to 1.25 times the land ratio of the imaginary middle region,
the five main grooves are a central main groove extending straight in the tire circumferential direction, two middle main grooves extending zigzag in the tire circumferential direction, and two shoulder main grooves extending zigzag in the tire circumferential direction,
the crown axial grooves and the middle axial grooves are each inclined to the intended tire rotational direction toward the axially inside of the tire,
the crown axial grooves and the middle axial grooves each have a widths of from 4.0 to 7.0 mm, and
the widths of the crown axial grooves are more than the width of the central main groove and less than the widths of the middle main grooves next to the central main groove,
each of the crown blocks is provided with
an inside notch at a midpoint of the crown block in the tire circumferential direction so as to extend axial outwardly from the central main groove and terminate within the crown block, and
an outside notch at a midpoint of the crown block in the tire circumferential direction so as to extend axially inwardly from the middle main groove and terminate within the crown block,
the ground contacting top surface of each of the crown blocks is provided with no void other than the inside notch and the outside notch,
each of the shoulder blocks is provided with
an inside notch at a midpoint of the shoulder block in the tire circumferential direction so as to extend axially outwardly from the shoulder main groove and terminate within the shoulder block, and
an outside notch at a midpoint of the shoulder block in the tire circumferential direction so as to extend axially inwardly from an axially outer edge of the shoulder block and terminate within the shoulder block,
the ground contacting top surface of each of the shoulder blocks is provided with no void other than the inside notch and the outside notch, and
each of the middle blocks has
an axially inner edge made up of three straight segments extending continuously in a zigzag form, and
an axially outer edge made up of three straight segments extending continuously in a zigzag form.

2. The pneumatic tire according to claim 1, wherein
each of the middle main grooves is a zigzag groove having two oblique parts per each zigzag pitch thereof, and
the two oblique parts are inclined to the axially outside of the tire toward the intended tire rotational direction.

3. The pneumatic tire according to claim 2, wherein
the crown axial grooves in both of the rows are arranged at identical circumferential pitches, and
the crown axial grooves in one of the rows are circumferentially shifted by a half pitch from the crown axial grooves in the other row.

4. The pneumatic tire according to claim 1, wherein
the crown axial grooves in both of the rows are arranged at identical circumferential pitches, and
the crown axial grooves in one of the rows are circumferentially shifted by a half pitch from the crown axial grooves in the other row.

5. The pneumatic tire according to claim 1, wherein axial lengths of the inside notches and the outside notches of the crown blocks are not less than 1.0 mm and not more than 5.0 mm.

6. The pneumatic tire according to claim 1, wherein axial lengths of the inside notches and the outside notches of the shoulder blocks are not less than 1.0 mm and not more than 5.0 mm.

7. The pneumatic tire according to claim 1, wherein axial lengths of the inside notches and the outside notches of the crown blocks and the shoulder blocks are not less than 1.0 mm and not more than 5.0 mm.

8. The pneumatic tire according to claim 7, wherein the ground contacting top surface of each of the middle blocks is provided with no void.

9. The pneumatic tire according to claim 1, wherein the ground contacting top surface of each of the middle blocks is provided with no void.

10. A pneumatic tire comprising
a tread portion provided with a unidirectional tread pattern having an intended tire rotational direction and defined by circumferentially continuously extending five main grooves dividing the tread portion into six rows of circumferentially arranged blocks which are a pair of axially inner rows of crown blocks circumferentially divided by crown axial grooves, a pair of axially outer rows of shoulder blocks circumferentially divided by shoulder axial grooves and a pair of in-between rows of middle blocks circumferentially divided by middle axial grooves, wherein
an imaginary crown region, which is defined between two lines extending parallel with the tire circumferential direction passing through both axially outermost ends of the crown blocks in each of the axially inner rows, has a land ratio of from 0.75 to 0.85,
an imaginary middle region, which is defined between two lines extending parallel with the tire circumferential direction passing through both axial ends of the middle blocks in each of the in-between rows, has a land ratio of from 0.65 to 0.75,
the land ratio of the imaginary crown region is in a range of from 1.05 to 1.25 times the land ratio of the imaginary middle region,
the five main grooves are a central main groove extending straight in the tire circumferential direction, two middle main grooves extending zigzag in the tire circumferential direction, and two shoulder main grooves extending zigzag in the tire circumferential direction,
the crown axial grooves and the middle axial grooves are each inclined to the intended tire rotational direction toward the axially inside of the tire,
the crown axial grooves and the middle axial grooves each have a widths of from 4.0 to 7.0 mm, and
the widths of the crown axial grooves are more than the width of the central main groove and less than the widths of the middle main grooves next to the central main grooves,
each of the crown blocks is provided with an inside notch at a midpoint of the crown block in the tire circumferential direction so as to extend axial outwardly from the central main groove and terminate within the crown block, and an outside notch at a midpoint of the crown block in the tire circumferential direction so as to extend axially inwardly from the middle main groove and terminate within the crown block, each of the shoulder blocks is provided with an inside notch at a midpoint of the shoulder block in the tire circumferential direction so as to extend axially outwardly from the shoulder main groove and terminate within the shoulder block, and an outside notch at a midpoint of the shoulder block in the tire circumferential direction so as to extend axially inwardly from an axially outer edge of the shoulder block and terminate within the shoulder block, and each of the middle blocks has an axially inner edge made up of only three straight segments extending continuously in a zigzag form, and an axially outer edge made up of only three straight segments extending continuously in a zigzag form.

11. The pneumatic tire according to claim 10, wherein each of the middle main grooves is a zigzag groove having two oblique parts per each zigzag pitch thereof, and the two oblique parts are inclined to the axially outside of the tire toward the intended tire rotational direction.

12. The pneumatic tire according to claim 11, wherein the crown axial grooves in both of the rows are arranged at identical circumferential pitches, and the crown axial grooves in one of the rows are circumferentially shifted by a half pitch from the crown axial grooves in the other row.

13. The pneumatic tire according to claim 10, wherein the crown axial grooves in both of the rows are arranged at identical circumferential pitches, and the crown axial grooves in one of the rows are circumferentially shifted by a half pitch from the crown axial grooves in the other row.

14. The pneumatic tire according to claim 10, wherein axial lengths of the inside notches and the outside notches of the crown blocks are not less than 1.0 mm and not more than 5.0 mm.

15. The pneumatic tire according to claim 10, wherein axial lengths of the inside notches and the outside notches of the shoulder blocks are not less than 1.0 mm and not more than 5.0 mm.

16. The pneumatic tire according to claim 10, wherein axial lengths of the inside notches and the outside notches of the crown blocks and the shoulder blocks are not less than 1.0 mm and not more than 5.0 mm.

17. The pneumatic tire according to claim 16, wherein the ground contacting top surface of each of the middle blocks is provided with no void.

18. The pneumatic tire according to claim 10, wherein the ground contacting top surface of each of the middle blocks is provided with no void.

\* \* \* \* \*